United States Patent
Zhou

[19]

[11] Patent Number: 5,926,544
[45] Date of Patent: Jul. 20, 1999

[54] DIRECT CURRENT FEED WITH LINE STATUS CHANGE ADAPTATION IN A COMMUNICATION SYSTEM

[75] Inventor: Yan Zhou, Austin, Tex.

[73] Assignee: Advanced Micro Devices, Inc., Sunnyvale, Calif.

[21] Appl. No.: 08/870,895

[22] Filed: Jun. 6, 1997

[51] Int. Cl.[6] .................................................. H04M 1/00
[52] U.S. Cl. ........................ 379/413; 379/399; 379/286
[58] Field of Search ........................... 379/93.05, 93.06, 379/93.07, 90.07, 413, 399, 286; 375/240; 364/7

[56] References Cited

U.S. PATENT DOCUMENTS

| | | | |
|---|---|---|---|
| 3,611,165 | 10/1971 | Hills | 327/557 |
| 4,106,102 | 8/1978 | Desblache | 364/724.07 |
| 5,226,059 | 7/1993 | Fasterling | 375/236 |
| 5,253,291 | 10/1993 | Naseer et al. | 379/406 |
| 5,323,460 | 6/1994 | Warner et al. | 379/399 |
| 5,583,934 | 12/1996 | Zhou | 379/399 |
| 5,636,273 | 6/1997 | Schopfer et al. | 379/412 |
| 5,744,944 | 4/1998 | Danstrom | 323/284 |
| 5,777,911 | 7/1998 | Sherry et al. | 364/724.13 |

Primary Examiner—Reinhard J. Eisenzopf
Assistant Examiner—Charles N. Appiah
Attorney, Agent, or Firm—Skjerven, Morrill, MacPherson, Franklin & Friel, L.L.P.; Kent B. Chambers

[57] ABSTRACT

A line card integrates subscriber line interface circuitry, A/D and D/A converters, and digital signal processing technology. The digital signal processing technology performs many line card tasks such as switch hook detection, ground key detection, DC feed control, polarity reversal, ringing tests, fault detection, power cross detection, and ring trip detection. The digitally processed DC feed control ensures that digitally filtered A (Tip) and B (Ring) conductor voltages closely follow actual subscriber loop Vab voltages to avoid circuitry saturation and to validate power feed operating point calculations relative to actual subscriber loop conditions. Furthermore, the DC feed control opens a Vab fluctuation window in high current gain areas of subscriber loop power feed to reduce noise.

28 Claims, 11 Drawing Sheets

DIRECT CURRENT FEED WITH LINE STATUS CHANGE ADAPTATION IN A COMMUNICATION SYSTEM

BACKGROUND OF THE INVENTION

1. Field of the Invention

This invention relates to communication systems and particularly to communication systems providing direct current feed to a transmission line.

2. Description of the Related Art

Communication systems utilizing transmission lines such as subscriber loops are commonplace throughout much of the world. Subscriber loops are terminated on one end by terminal equipment and provide a path for the terminal equipment to communicate with other terminal equipment via, for example, a vast network of central offices, private branch exchanges, satellite relay systems, transmission lines, repeaters, and wireless systems. FIG. 1 illustrates a portion of a conventional subscriber loop communication system 100. The subscriber loop 102 is modeled as a balanced two-wire transmission line 103, with loop resistances R and inductances L and leakage impedance modeled by capacitor 104 and resistor 106. The subscriber loop 102 is terminated on respective ends by terminal equipment 110 and a central office 122 line card 120. The subscriber loop 102 provides a communication path for information transmission such as voice signals and signaling information between a subscriber's terminal equipment and the central office 108.

Terminal equipment 110 is illustratively modeled as a telephone with off-hook resistance 112, nominally 200 ohms, and ringer impedance Z, which may be modeled, for example, as a series RC or series RLC circuit. Terminal equipment 110 includes a switch hook 118 which loads the subscriber loop 102 on the subscriber end with resistance 112 when the terminal equipment 110 is off-hook (as shown) and loads subscriber loop 102 with ringer impedance Z when the terminal equipment 110 is on-hook. Terminal equipment 110 may be any of a variety of devices besides the familiar, ubiquitous telephone such as facsimile machines, private branch exchanges, voice mail systems key telephone systems, computers, modems, telephone answering machines, alarm systems, and radio control systems, as well as many other devices.

The other end of the subscriber loop 102, opposite terminal equipment 110, converges on line card 120 of central office 122. The line card 120 terminates subscriber loop 102 at conductors A (Tip) and B (Ring) with a feed impedance of 900 ohm or other standard feed impedance The line card 120 provides a gateway to the public switched telephone network (PSTN) through switching network 124.

Referring to FIG. 2, the subscriber line interface circuit (SLIC) 202 of line card 120 provides a two-wire interface 204 to the generally analog signal carrying subscriber loop 102. The SLIC 202 performs a variety of interface functions that allow terminal equipment 110 to communicate with other terminal equipment (not shown). The SLIC 202 and the subscriber loop audio-processing circuit (SLAC) 206 carry out the well-known BORSCHT (Battery feed, Overvoltage protection, Ringing, Supervision, Coding, Hybrid, and Test) functions. The SLIC 202 monitors direct current (DC) levels on the subscriber loop 102 with ground key detector circuitry 208 and off-hook detector circuitry 210. Input decoder and control circuitry 214 provides a mechanism for other circuitry (not shown) in the central office 122 and for SLAC 206 to control such SLIC 202 functions as subscriber loop 102 activation, ringing, and polarity reversal. Analog two-wire interface 204 and signal transmission circuitry 212 cooperate in sensing subscriber loop 102 metallic voltage (voltage at conductor A minus voltage at conductor B or Vab) while generally having a high rejection of longitudinal voltages (Vab_long). Alternating current (AC) signals, such as voice signals, are transmitted over subscriber loop 102 to terminal equipment 110 by two-wire interface 204 and signal transmission circuitry 212 in response to voice information input signals received from central office 122 through SLAC 206. The ring relay driver 216 activates a relay(s) which connects a ringing signal from a central office 122 ringing AC voltage generator (not shown) and DC voltage bias source, to terminal equipment 110 when a third party is calling. While terminal equipment 110 is on-hook, switch hook 118 connects subscriber loop 102 across the ringer impedance Z (FIG. 1). The ring trip detector circuitry 218 detects an off-hook condition of terminal equipment 110 and initiates cessation of the ringing signal application to subscriber loop 102.

The SLAC 206 generally filters and converts analog output signals received from SLIC 202 into digital signals (A/D), processes the signals in accordance with control and timing information, and compresses the digital signals. The pulse code modulation (PCM) interface 220 provides PCM signals to the central office 122. SLAC 206 also generally receives digital audio input signals from the central office 122 via PCM interface 220, expands the digital input signals, processes the signal in accordance with control and timing information, and converts the digital signals into analog signals (D/A) for input to SLIC 202. Additional information on SLICs and SLACs is found in the 1995 Advanced Micro Devices of California data book entitled "Linecard Products for the Public Infrastructure Market."

The power feed controller 222 includes a battery feed circuit and a polarity reversal circuit. The battery feed functions supply direct current from a central office battery (not shown) to the subscriber loop 102 through balanced feed resistances at conductors A and B. Loop current is generally limited to no more than 45 to 75 milliamperes (mA) in a low-resistance subscriber loop. Higher subscriber loop resistances generally result in lower subscriber loop current. The on-hook subscriber loop powering voltage is typically the battery voltages minus 48 Volts DC (Vdc) less any overhead voltage, typically about 4 Vdc, necessary to prevent SLIC 202 saturation. Battery feed specifications are regionally provided and conform with specifications provided by, for example, BELLCORE, the Electronic Industries Association (EIA), British Telecom, and the International Telegraph and Telephone Consultative Committee (CCITT).

When the terminal equipment 110 goes off-hook, the line impedance of subscriber loop 102 drops suddenly from at least tens of thousands of ohms suddenly to 0.2–2 kohms in a matter of milliseconds. This sudden subscriber loop 102 impedance drop causes the DC current (Idc) in subscriber loop 102 to rapidly increase. Noise voltages may also cause Idc to suddenly change. Even with low pass filtering by SLIC 202, the long decay times of a low pass filter can allow this large Idc change to readily saturate the conventional analog circuitry used to implement SLIC 202 and SLAC 206. Furthermore, low pass filtering of Idc may temporarily mask the sudden current change and, thus, result in unacceptable response times of SLIC 202 and SLAC 206. SLIC 202 may attempt to increase filter response times to the subscriber loop 102 impedance changes by utilizing diode networks in parallel with low pass filtering resistances to reduce the RC time constant of the low pass filter.

The analog technology used to implement power feed controller 222 makes precisely controlling input and output signal characteristics of SLIC 202 difficult especially in a dynamic operational and regulated environment. Additionally, analog circuitry often suffers from well-known aging side effects such as instability and circuit parameter drifting which may affect long-term reliability. Moreover, analog circuit features in an integrated circuit are large, presently in general on the order of about 7 μm, which increases costs of analog integrated circuitry. Furthermore, providing a cost efficient common hardware platform which lends itself to cost effective modifications to conform with various regional standards and operating environments is at least a difficult problem.

SUMMARY OF THE INVENTION

In one embodiment, a communication system line card employs the precision and stability of digital signal processing technology with the flexibility of software to provide reliable and adaptable interfacing to one or more subscriber loops. A central office generally communicates and processes digital signals. Digitally processed signals are made directly available to the central office and the line card which in at least one embodiment enhances the overall capabilities and efficiencies of the communication system by, for example, efficiently allocating processing resources and control functions. The line card provides power to each subscriber channel in accordance with regional specifications while providing noise immunity often associated with dynamic line conditions. The line card rapidly detects changing subscriber loop conditions to, for example, avoid any circuit saturation and provide a rapid response to ensure compliance with regional battery feed specifications.

In one embodiment of the present invention, a method includes the steps of sampling data across conductors of a transmission line in a communication system and digitally filtering the sampled data at a first bandwidth of a digital filter. The method further includes the steps of detecting a sampled data condition and changing the bandwidth of the digital filter to a larger, second bandwidth in response to detecting the sampled data condition to increase the response time of the digital filter. In another embodiment, the method further comprises the steps of supplying power from the communication system to the transmission line, determining a power curve for the supplied power to follow, the power curve having a saturation region, regulating the supplied power in accordance with the power curve unless the supplied power is within the saturation region, and, if the supplied power is in the saturation region of the power curve, regulating the supplied power within a predetermined window in the power curve saturation region without changing the supplied power if the supplied power is within the predetermined window.

In another embodiment of the present invention, a method of feeding direct current to a transmission line in a communication system and adapting to an impedance change in the transmission line include the steps of feeding direct current to the transmission line with circuitry of the communication system and sampling a voltage (Vab) across A and B conductors of the transmission line to obtain Vab_l. The method further includes the steps of digitally filtering Vab_l at a first bandwidth to obtain a filtered voltage (Vab_f), determining if Vab_f has diverged from Vab_l outside of a first predetermined margin, and changing the first bandwidth to a larger, second bandwidth so that Vab_f more rapidly follows Vab within a predetermined amount of time.

In another embodiment of the present invention, a communication system includes circuitry for sampling signal data on a subscriber loop, and a line card having a processor and a memory, the memory storing code for execution by the processor, the code including instructions for processing the signal data with a low pass filter to substantially remove an alternating current signal component from the signal data, for detecting a ring trip on the subscriber loop, for detecting a short duration short circuit at the subscriber loop, and for preventing processing of the signal data with the low pass filter if a short duration short circuit at the subscriber loop is detected.

In a further embodiment of the present invention, a communication system includes a line card having subscriber loop terminals to connect to respective subscriber loops. The line card further includes a plurality of subscriber line interface circuits coupled to respective subscriber loop terminals, a plurality of analog to digital converters coupled to respective groups of the subscriber line interface circuits, a processor coupled to the analog to digital converters, and a memory coupled to the processor and storing code for execution by the processor for data from each subscriber line interface circuit, the code having instructions to compare a sampled voltage across the subscriber loop terminals, Vab_l, with a supply voltage used by the respective subscriber line interface circuit, to process Vab_l with a first digital low pass filter to obtain Vab_f, to open the bandwidth of the first digital low pass filter if the comparison between Vab_l and the supply voltage is within a first predetermined margin, to compare Vab_l with Vab_f, and to open the bandwidth of a second digital low pass filter if the comparison between Vab_l and Vab_f is outside of a second predetermined margin.

BRIEF DESCRIPTION OF THE DRAWINGS

Features appearing in multiple figures with the same reference numeral are the same unless otherwise indicated.

DETAILED DESCRIPTION

The following description of the invention is intended to be illustrative only and not limiting.

Figure 3:
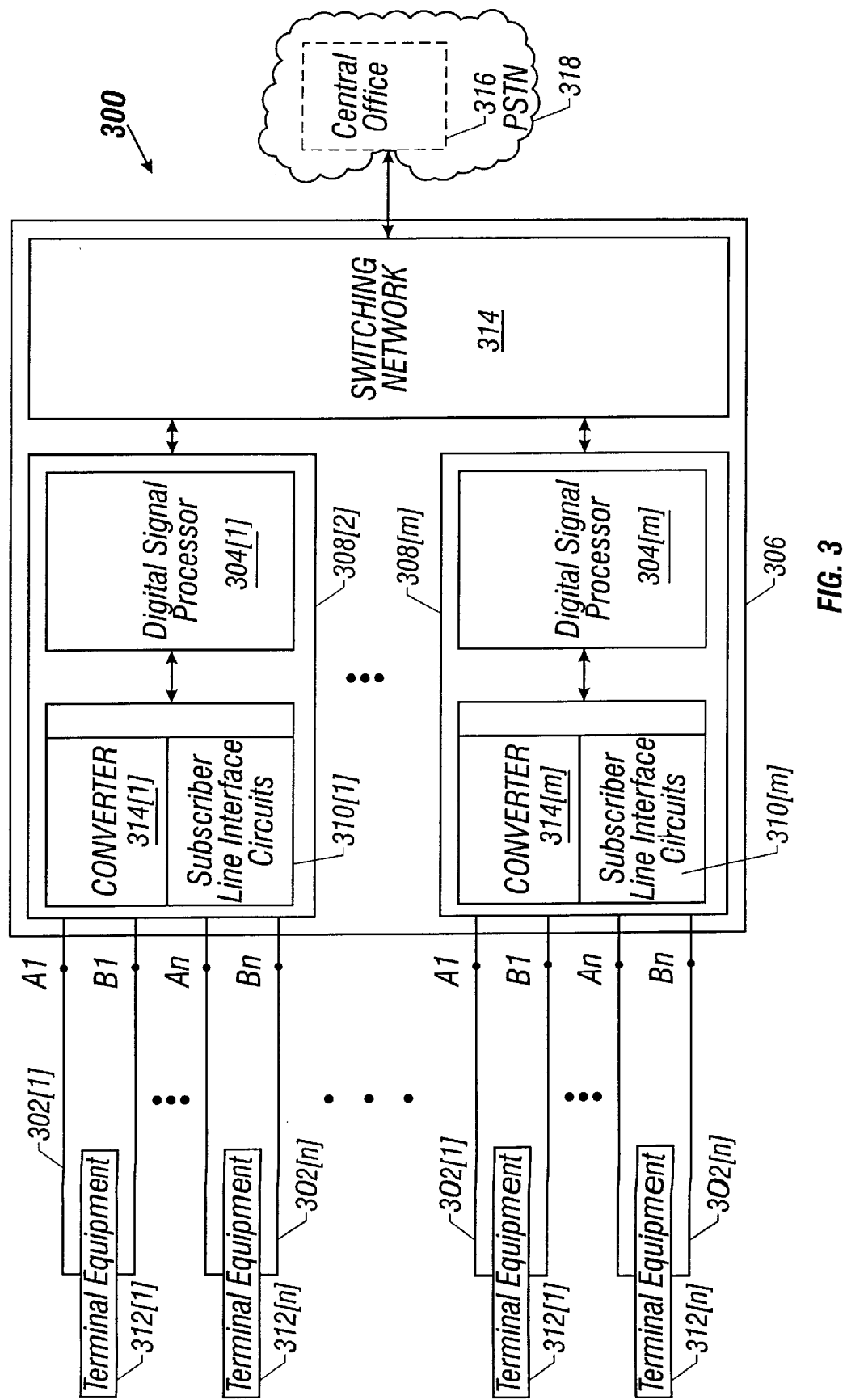
FIG. 3 illustrates a communication system having a line card employing a digital signal processor.

Referring to FIG. 3, in the communication system 300, each of the line cards 308[m] through 308[1] (308[m:1]) integrates analog data sensing and driving circuitry of SLICs 310[m:1], respectively, with programmable digital signal processors 304[m:1], respectively. Thus, the line cards 308 [m:1] deliver adaptability through programmability and long-term precision with digital signal processing circuitry stability in digital signal processors 304[m:1]. Thus, line cards 308[m:1] are well suited to assume functionality conventionally tasked to analog SLIC circuitry. Furthermore, the digital signal processing circuitry integrated circuit features are generally much smaller than analog circuit features and may be on the order of, for example, 0.25 μm which decreases the cost of line cards 308[m:1] relative to any analog signal processing features.

Figure 1:
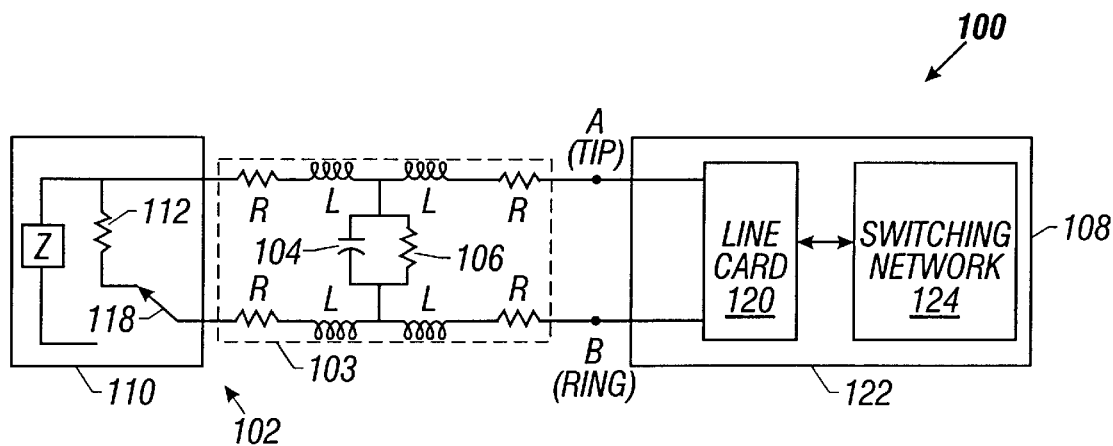
FIG. 1, labeled prior art, illustrates a subscriber loop terminated by subscriber terminal equipment and central office equipment.
Figure 2:
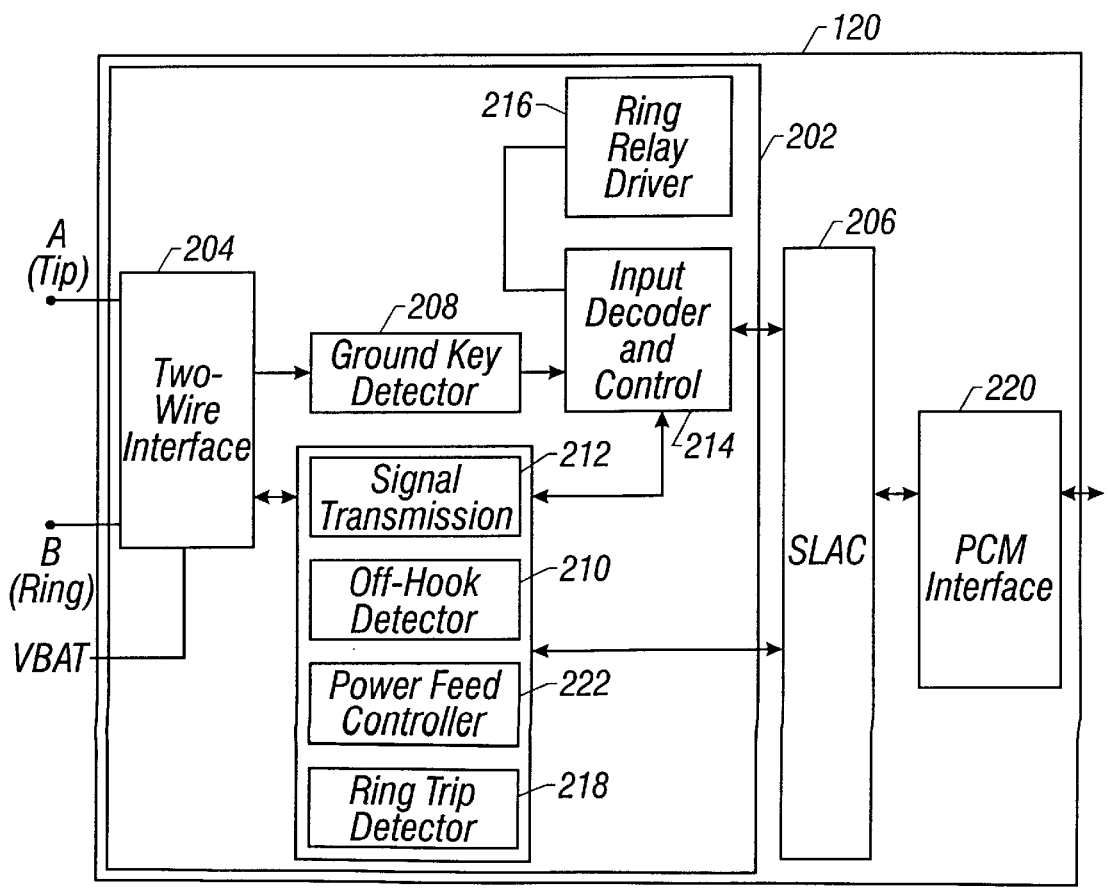
FIG. 2, labeled prior art, illustrates a line card of the central office equipment of FIG. 1.
Figure 4:
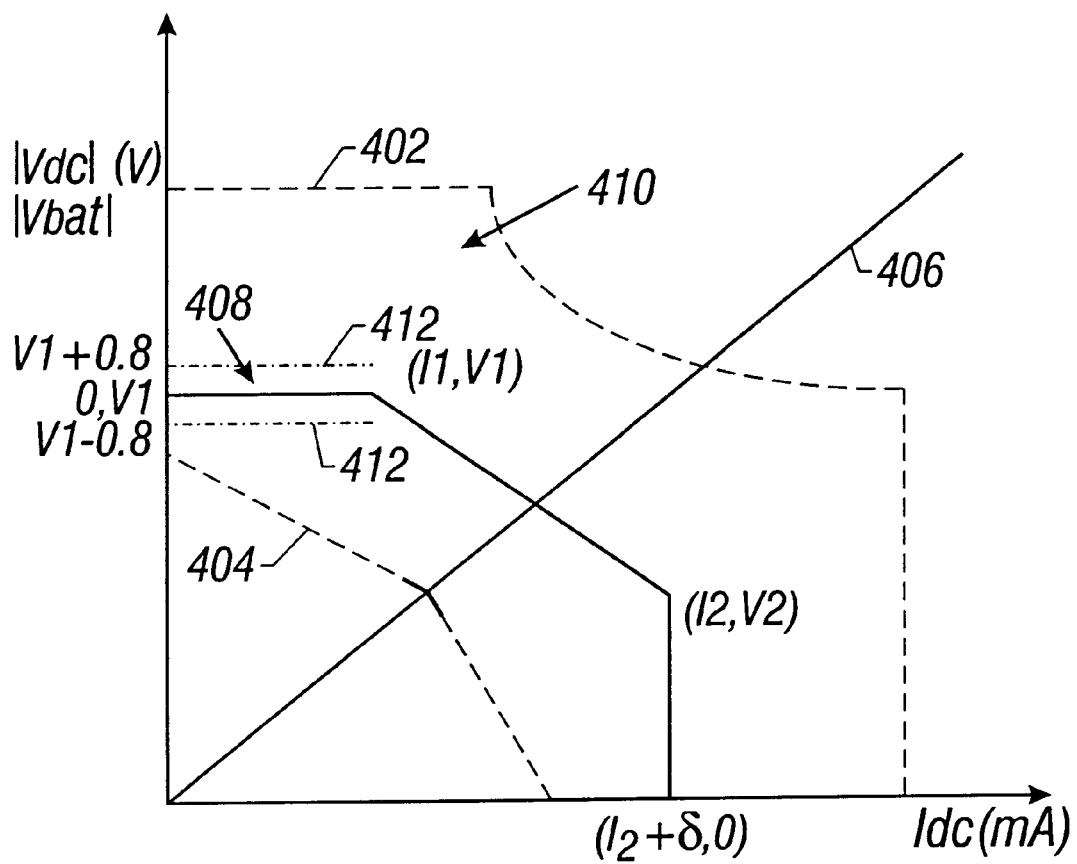
FIG. 4 illustrates an exemplary subscriber loop direct current power envelope.

One important function of line cards 308 [m:1] is the subscriber loop battery feed function. The power that a line card must deliver to the subscriber loop during on- and off-hook conditions is generally specified by a regional standard. Direct current is applied through a subscriber loop, such as subscriber loop 102 (FIG. 1) and subscriber loops 302[n:l], by line cards 308[m:1] to control power feed during off-hook conditions and during on-hook conditions if any of subscriber loops 302[n:1] exhibit any resistive leakage impedance. FIG. 4 illustrates an exemplary DC power envelope 400 standard which represents the relationship between DC voltage Vab(DC) applied across the A and B conductors of a subscriber loop 302[x] and the DC current applied through the subscriber loop 302[x] during on- and off-hook conditions where "subscriber loop 302[x]" represents any of subscriber loops 302[n:1].

Referring to FIGS. 3 and 4, the power envelope 400 is defined by a maximum boundary 402 and minimum boundary 404. Subscriber loop voltage and current relationships must reside within the confines of the power envelope 400 during all subscriber loop 302[x] impedance conditions. The orientation of DC load line 406 relative to the voltage and current axes graphically indicates the resistance of subscriber loop 302[x]. As the subscriber loop 302[x] resistance increases, load line 406 moves toward the vertical, DC voltage axis, and as the subscriber loop 302[x] resistance decreases, load line 406 moves toward the horizontal, DC current axis. The digital signal processors 304[m:1] of line cards 308[m:1], respectively, are programmed to supply power in accordance with the piece wise linear DC battery feed curve 408 which is determined in one embodiment as described in U.S. patent application Ser. No. 08/699,049 by Yan Zhou entitled "Digital Direct Current Feed Control For A Communication System", filed on Aug. 21, 1996, (Zhou— Digital Direct Current Feed Control) which is incorporated herein by reference in its entirety.

The line cards 308[m:1] maintain DC battery feed operating points of subscriber loops 302[n:1], respectively, generally at the intersection of load line 406 and DC battery feed curve 408. The saturation region 410 of the power envelope 400 is located around the DC battery feed curve 408 constant voltage segment bounded by coordinates (0,V1) and (I1, V1). As described in more detail below, the line cards 308[m:1] perform the nontrivial task of quickly adapting to sudden changes in Vab of respective subscriber loops 302 [n:1] in the saturation region 410 which could otherwise, for example, cause circuitry in the SLICs 310[m:1] and circuitry in terminal equipment 312[n:1] to saturate. Additionally, the line cards 308[m:1] quickly adapt to sudden changes in Vab to allow digital voltage input signals to the digital signal processors 304[m:1] to accurately follow actual sensed line voltage conditions during sudden voltage changes. Furthermore, the line cards 308[m:1] selectively eliminate feedback, especially in the high current gain saturation region 410, to reduce noise.

Referring to FIG. 3, "m" line cards 308[m:1] may be located in a central office 306, and each of line cards 308[m:1] may support "n" subscriber loops 302[n:1] (also referred to as "channels") where "m" and "n" are integers and "n" may vary from line card to line card. Each of subscriber loops 302[n:1] may be modeled as subscriber loop 102 or modeled in accordance with other transmission line models, and each of the terminal equipment 312[n:1] may be represented by devices such as terminal equipment 110. Each of SLICs 310[m:1] includes "n" subscriber line interface circuits respectively connected to subscriber loops 302[n:1]. SLICs 310[m:l] of line cards 308[m:1] sense data from subscriber loops 302[n:l] such as actual DC line voltage Vab_DC, and AC line signal voltage Vab(AC) across conductors A and B. Line current data, Ia and Ib at conductors A and B, respectively, are generally sensed by SLICs 310[m:1] through external balanced feed resistors (not shown). SLICs 310[m:1] also drive DC feed current, ringing signals, and signaling transmissions, and other data onto subscriber loops 302[n:1], respectively. When DC feed current is flowing into the A conductor from SLICs 310[m:1] and out of the B conductor to respective SLICs 310[m:1], Ia equals the DC feed current minus any longitudinal current, Ilong, and Ib equals the DC feed current plus Ilong. When the DC feed current is reversed during polarity reversals, Ia equals the DC feed current plus Ilong, and Ib equals the DC feed current minus Ilong. Thus, for balanced subscriber loops 302[n:1], Ia minus Ib equals the metallic current, Iab_met, in respective subscriber loops 302[n:1 ] regardless of the polarity of conductors A and B.

Converters 314[m:1] are two-way communication links between respective digital signal processors 304[m:1] and corresponding analog SLICs 310[m:1]. Each of SLICs 310 [m:1] provides analog data signals to a respective digital signal processor 304[m:1], and the digital signal processors 304[m:1] provide digital control and information data signals through D/A converters to the SLICs 3 10[m:1], respectively. The converters 314[m:1] sample signals, such as the parametric information sensed by SLICs 310[m:1], and perform A/D conversions which allow the analog SLICs 310[m:1] and respective digital signal processors 304[m:1] to communicate with each other. The converters 314[m:1] may also decimate signals from the respective SLICs 310 [m:1] and interpolate signals from the digital signal processors 304[m:1]. Additionally, converters 314[m:1] may frame digital signals in accordance with predetermined slot assignments allocated to each of SLICs 310[m:1] and transmit the framed information in a serial data stream to digital signal processors 304[m:1]. Conversely, converters 314[m:1] may parse a serial data stream or streams received from digital signal processors 304[m:1] to transmit respective data to SLICs 310[m:1].

Terminal equipment 312[n:1] may each transmit data signals to any other terminal equipment 312[n:1], connected to the same or different line card, or to terminal equipment (not shown) which is connected to central office 316 or to any other terminal equipment in the PSTN 318, within a private network, or within a wireless network. The data signals from each of terminal equipment 312[n:1] are digitized and routed by the switching network 314 to the intended terminal equipment recipient in accordance with transmitter and receiver identification information.

Figure 5A:
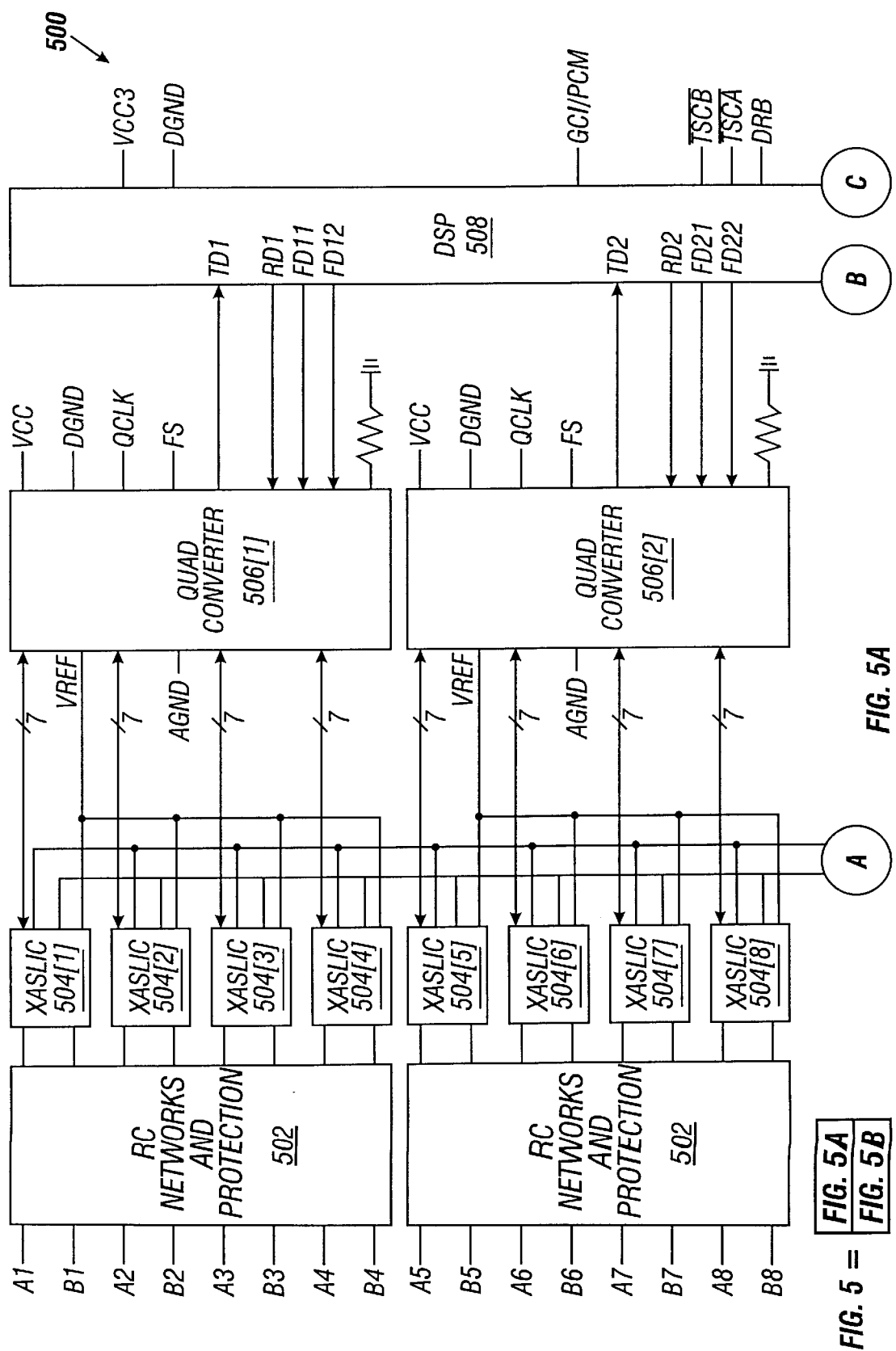
FIG. 5 illustrates an embodiment of the line card of FIG. 3.
Figure 5B:
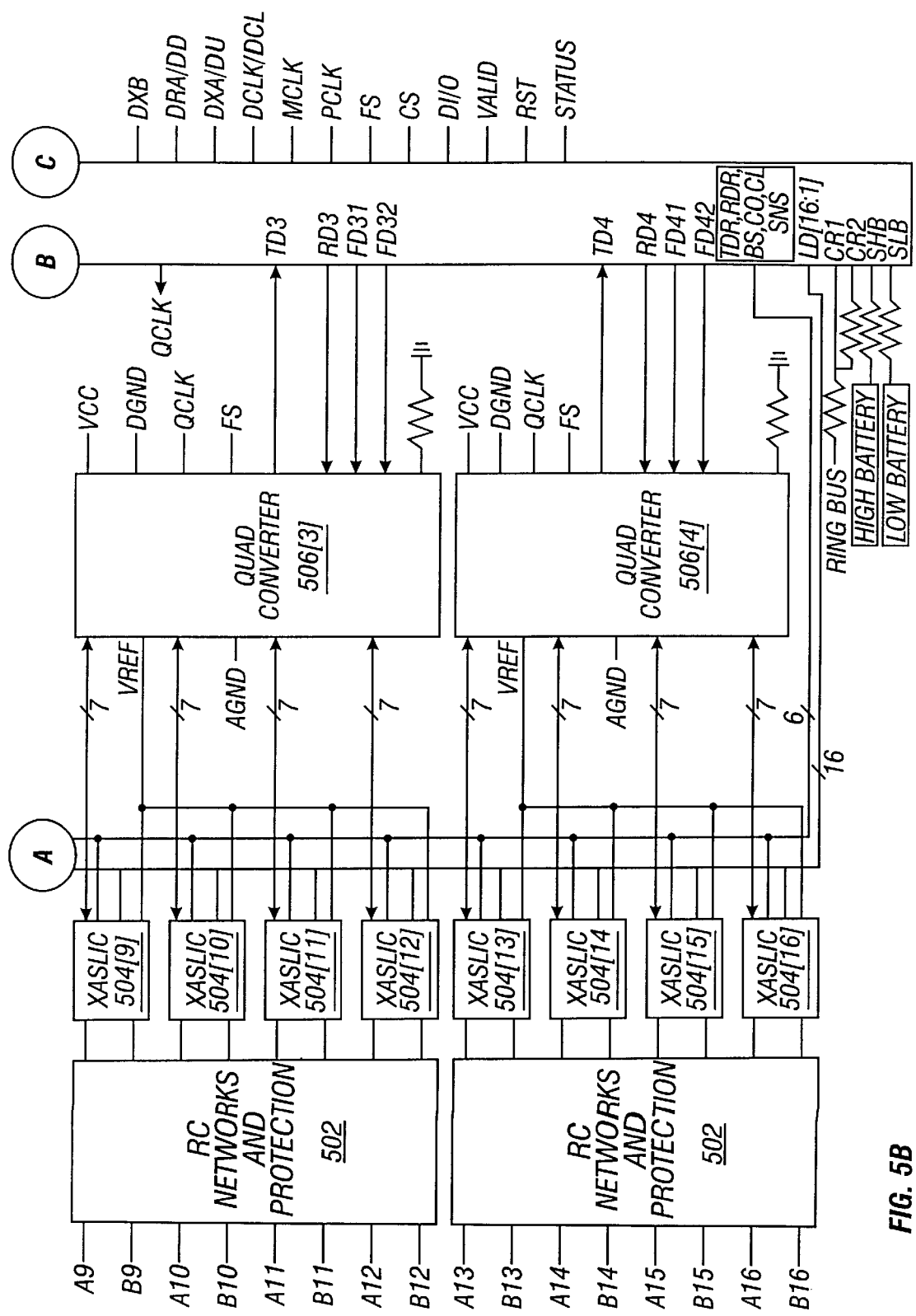

Referring to FIG. 5, one embodiment of each of the respective line cards 308[m:1] is sixteen channel line card 500 which may terminate 16 separate subscriber loops (not shown) such as subscriber loops 302[n:1] where "n" equals 16. Each of the A and B conductors, A[16:1] and B[16:1], are coupled through RC networks and protection circuitry 502. The RC networks and protection circuitry 502 provide an interface between terminal equipment 312[16:1] and subscriber line interface circuits (XASLICs) 504[16:1], respectively. The RC networks and protection circuitry 502 prefilter input signals received from connected terminal equipment and provide, for example, over current protection for the line card 500. Respective current sense resistors in series between the A and B conductors of each subscriber loop and terminal equipment allow Ia and Ib current samples to be taken by an XASLIC.

The XASLICs 504[16:1] represent an embodiment of SLICs 310[m:1] (FIG. 3), respectively. Subscriber loop 302[x] data, such as AC signal voltage Vab_AC, DC voltage Vab_DC, and currents at the subscriber loop A and B conductors, Ia and Ib, respectively, is sensed by each of the XASLICs 504[16:1]. XASLICs 504[16:13], XASLICs [12:9], XASLICs[8:5], and XASLICs[4:1] transmit analog output signals representative of the sensed subscriber loop parametric information to quad converters 506[4:1], respectively. Additionally, XASLICs 504[16:1] receive analog data signals, such as voice signals, a dial tone signal, ringing signals, a DC feed control signal, and a reference voltage, from a connected one of quad converters 506[4:1]. These data signals are superimposed upon a DC bias voltage determined by the DC feed control signal and transmitted over a subscriber loop to terminal equipment. The respective DC feed control signals dictate the polarity of DC bias voltage and the magnitude of DC feed current supplied to the subscriber loops 302[16:1] by each of the XASLICs 504 [16:1], respectively. The DC feed control signals ensure that power supplied to respective subscriber loops 302[16:1] remains within the power envelope dictated by regional specifications and illustratively shown in FIG. 4.

In one embodiment, each of the converters 314[m:1] (FIG. 3) is divided into four quad converters 506[4:1]. Each of the quad converters 506[4:1] provides an A/D and D/A conversion interface between four of the XASLICs 504 [16:1] and the digital signal processor 508. AC input signals from XASLICs 504[16:1] such as voice signals are sampled with 6 bit resolution at a frequency of 4 MHz and decimated to reduce the sampling frequency to 32 kHz. Three data signals representing Vab, Ia, and Ib from each of the sixteen supported subscriber loops are all sampled by respective A/D converters with 10 bit resolution at a sampling frequency of 4 kHz. Additionally, Ia is used as an input to thermal shutdown circuitry to detect and respond to potentially dangerous current levels on a subscriber loop. Each of the quad converters 506[4:1] place all of the converted input signals from all sixteen XASLICs 504[16:1] into respective predetermined slots in a 4 MHz digital serial data stream. The 4 MHz serial data streams from each of the quad converters 506[4:1] are received and processed by the digital signal processor 508.

The quad converters 506[4:1] also each receive three 4 MHz serial digital data streams from the digital signal processor 508 which include information for the subscriber loops 302[16:1] supported by the quad converters 506[4:1] and for range control for the respective Vab, Ia, and Ib data input signals to the A/D converters. The range control allows resolution of particular data to be increased or decreased. The digital signal processor 508 output serial data streams include predetermined slots with signal data, such as voice signal data, DC feed control data, and longitudinal voltage compensation data for each of subscriber loops 302[16:1]. These serial data streams are converted into parallel data, parsed for transmission to each of the XASLICs[16:1] from predetermined slots, and routed to respective linear interpolators (not shown). The respective DC feed signal data for each of subscriber loops 302[n:1] is also parsed and routed to respective DC feed linear interpolators (not shown) to increase the sampling frequency from 250 Hz to 256 kHz. The digital output signals from each DC feed linear interpolator are converted into an analog DC feed control signal for respective XASLICs 504[16:1]. XASLICs 504[16:1] provide DC current feed to subscriber loops 302[16:1] respectively, in response to DC current feed levels indicated by the respective DC feed control signal from digital signal processor 508. Four bit resolution longitudinal voltage compensation data signals from digital signal processor 508 for each of subscriber loops 302[16:1], respectively, is also parsed and routed to a D/A converter. The corresponding output analog signals are transmitted to the respective XASLICs 504[16:1] connected to subscriber loops 302[16:1], respectively.

Figure 6A:
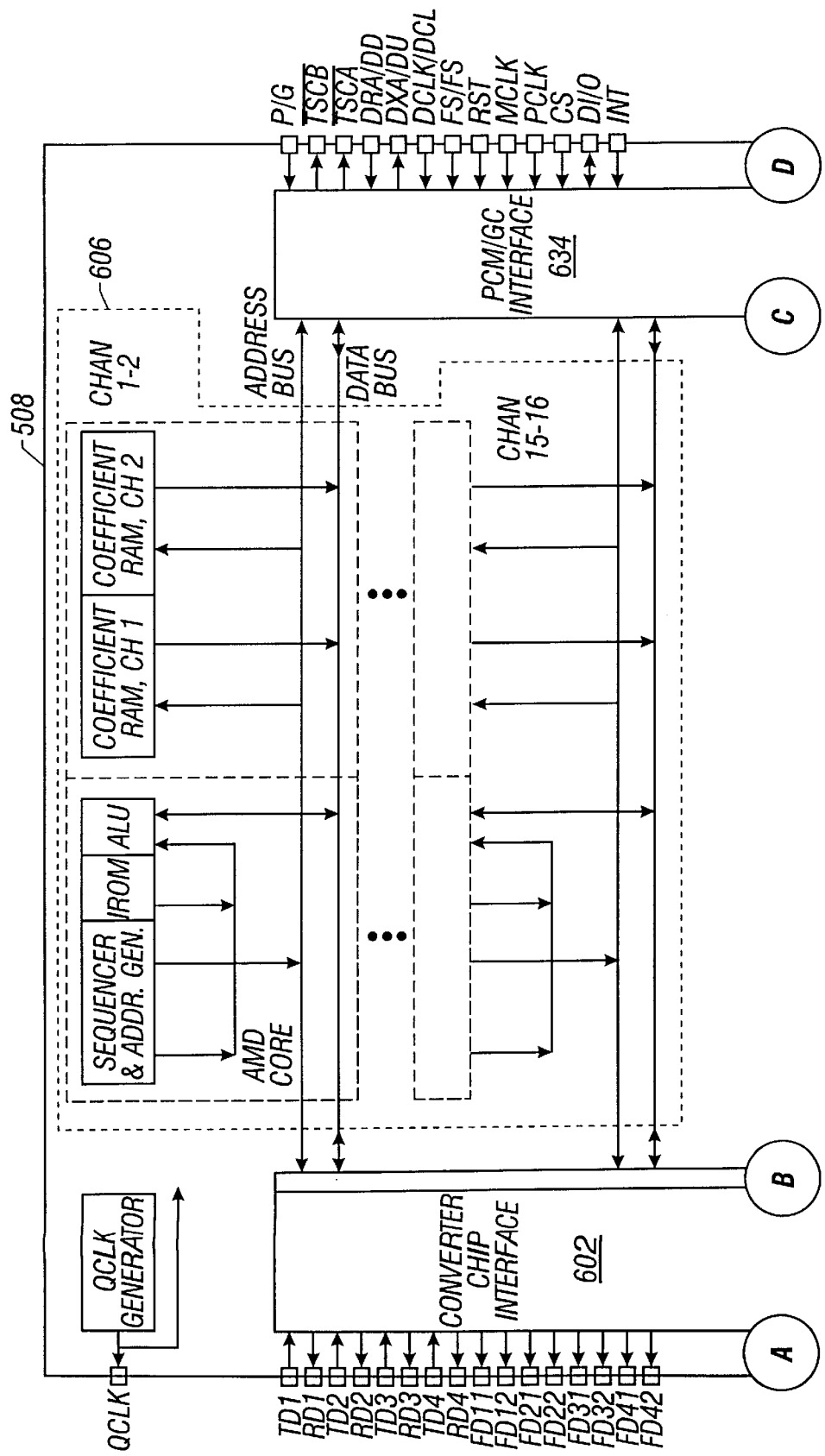
FIG. 6 illustrates an embodiment of the digital signal processor of FIG. 3.
Figure 6B:
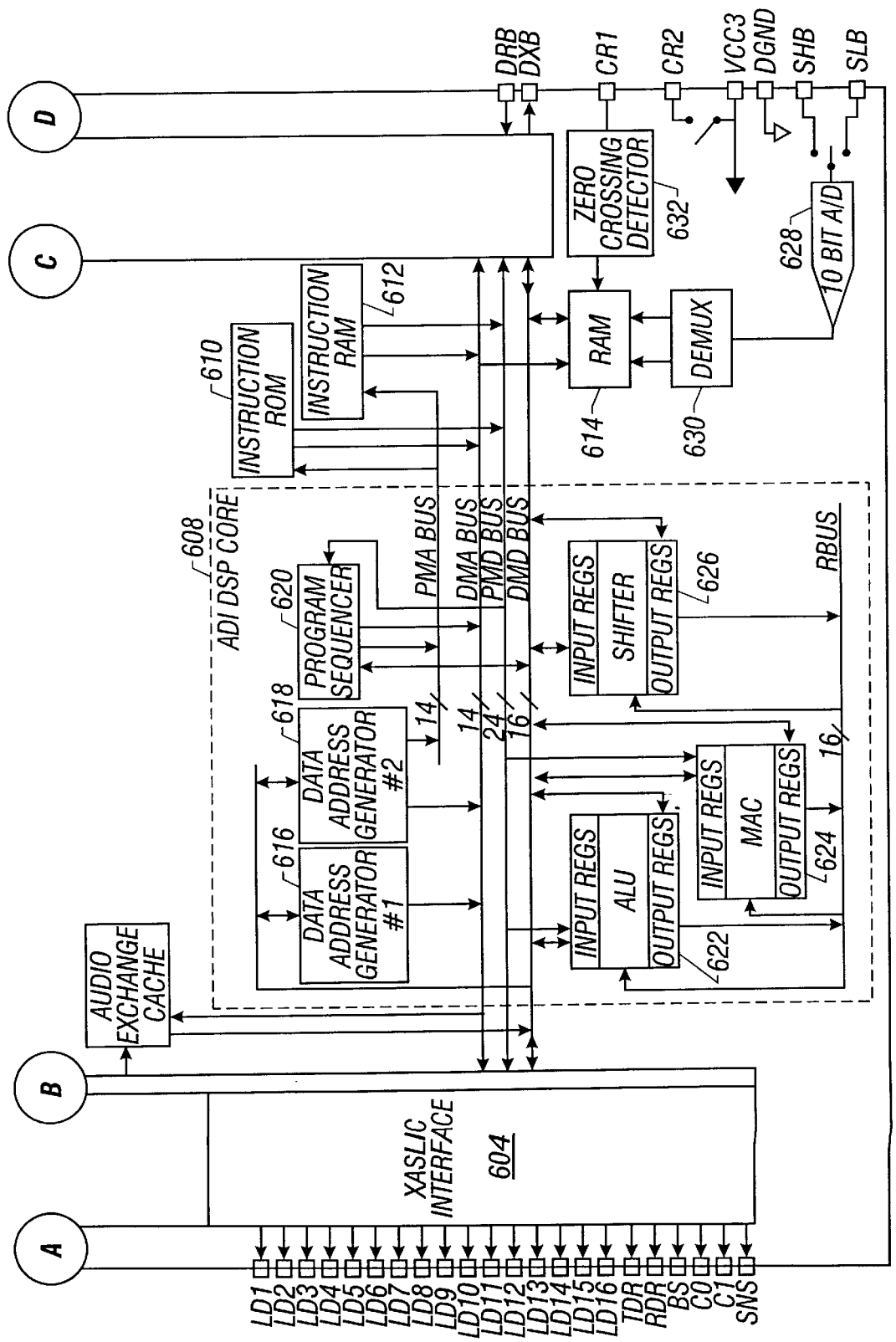

Referring to FIG. 6, the digital signal processor 508 interconnects to the quad converters 506[4:1] through output terminals TD[4:1], RD[4:1], FD11, FD12, FD21, FD22, FD31, FD32, FD41, and FD42 of converter chip interface 602. Converter chip interface 602 processes the serial data streams from each of quad converters 506[4:1] to retrieve information from each predetermined slot in the serial data streams. Thus, information from each of XASLICs 504 [16:1] is available for individual processing by audio processor core 606 and digital signal processor core 608. Converter chip interface 602 also assigns information for respective XASLICs 504[16:1] and quad converters 506 [4:1] from audio processor core 606 and digital signal processor core 608 to respective predetermined time slots in the 4 MHz digital output serial data streams. Each of quad converters 506[4:1] receives three 4 MHz digital data streams from digital signal processor 508, one for audio signals and two for DC feed control and the A/D range control. Digital signal processor 508 also programs a register (not shown) of each of XASLICs 504[16:1] with output signals LD[16:1], respectively, TDR, RDR, BS, C0, C1, and SNS transmitted through the XASLIC interface 604. The register (not shown) controls XASLIC modes such as standby, active, and ringing modes. XASLIC interface 604 inserts register information in predetermined slots for each of respective XASLICs 504[16:1]. Audio processor core 606 provides digital audio signal processing.

The digital signal processor core 608 processes instructions stored in instruction ROM (read only memory) 610 and instruction RAM (random access memory) 612. Data addresses are generated by data address generator #1 616 and data address generator #2 618. The program sequencer 620 provides program execution timing. To perform various arithmetic operations, digital signal processor core 608 also includes an arithmetic logic unit 622, a multiply, accumulate, and carry unit 624, and a shifter 626, each with respective input and output registers.

To utilize accurate, real time central office 306 battery voltage levels in various calculations, central office 306 high and low battery voltages are sampled from input terminals SHB and SLB, respectively. The voltages at input terminals SHB and SLB are sampled by 10 bit A/D converter 628, demultiplexed by demux 630, and stored in RAM 614 as Vbat. Ringing voltage signals from the central office 306 ring generator (not shown) are received at input terminals CR1 and CR2. Zero crossing detector 632 provides data to RAM 614 representing zero crossings of external ringing signals generated by central office 306. Digital signal processor operates on 5 V supplied by the central office 306 at input terminal VCC3. The digital signal processor core 608 and audio processor core 606 transmit to and receive communication signals from the central office 306 (FIG. 3). These communication signals are converted to and from PCM signal format by the PCM/microprocessor interface 634. The PCM/microprocessor interface 634 supports standard direct digital information transfer of, for example, digital filter coefficients, between the line card 508 and central office 306.

Figure 7:
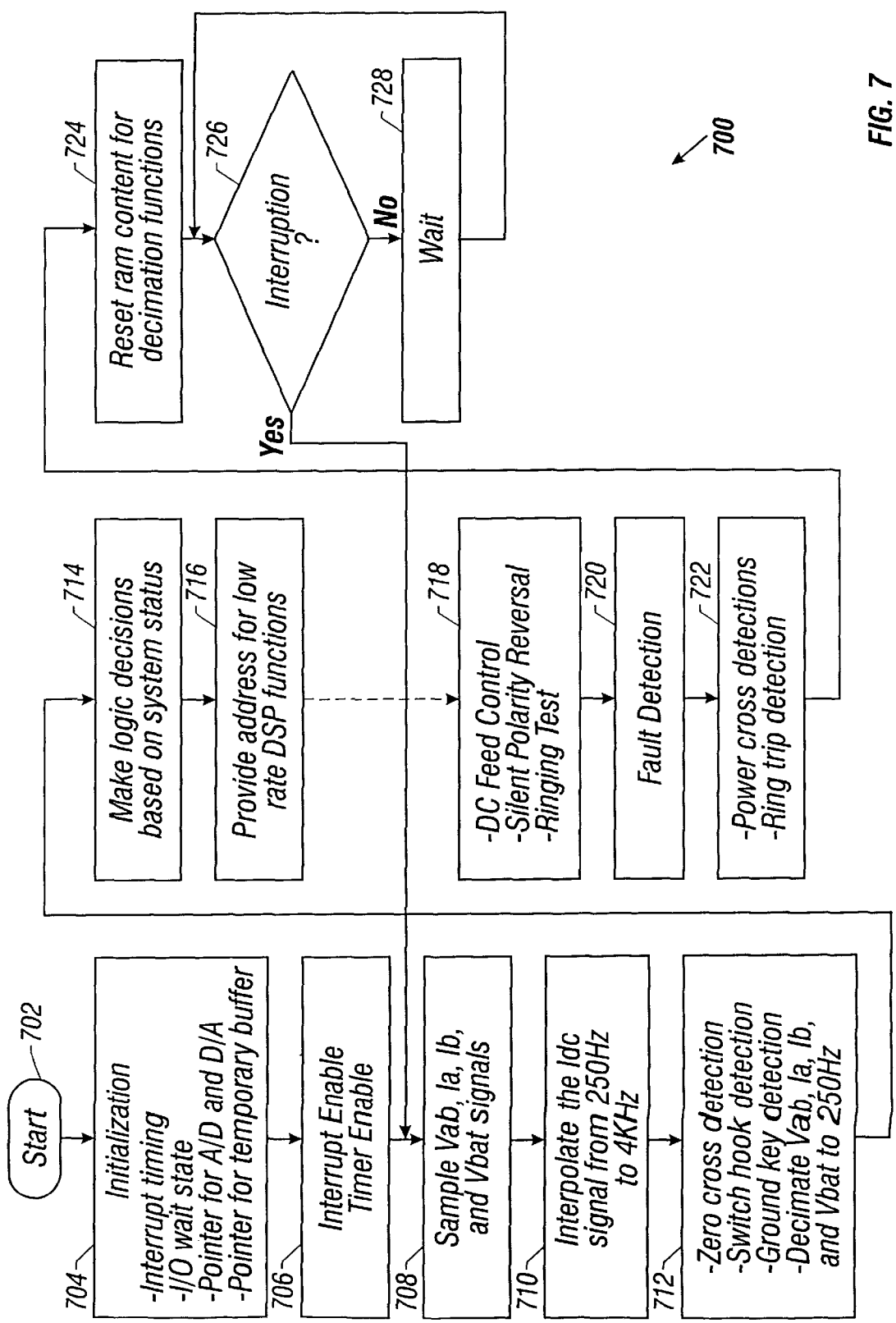
FIG. 7 illustrates an execution timing flow diagram of the digital signal processor of FIG. 6.

Referring to FIG. 7, the digital signal processor 508 executes an endless loop of operation modules. The computer program execution timing of the digital signal processor core 608 proceeds as illustrated in the signal processing flow 700. When the digital signal processor core 608 is started at operation 702, an initialization module 704 sets up interrupt timing so that signal processing flow 700 executes at a predetermined rate. I/O wait states, pointers for the A/D and D/A module 708, and a pointer for a temporary buffer are also set up in operation 702. After initialization, interrupts and a timer are enabled as shown in operation 706. Next, the A/D and D/A module 708 is executed and parametric data, Vab, Ia, and Ib, sampled by each of the XASLICs 504[16:1] (FIG. 5) from each of the respective subscriber loops 302[16:1] and Vbat are retrieved for use by the digital signal processor core 608 in subsequent processing. In operation 710, an interpolator is set up to interpolate 250 Hz data from the digital signal processor 508 to 4 kHz data.

The digital signal processor core 608 then proceeds in subscriber loop status and decimation operation 712 to successively execute zero cross detection, switch hook detection, and ground key detection modules. The zero cross detection module detects the voltage and current zero crossing of an integral ringing signal supplied by the line card 500. Ring relays of the line card 508 disconnect any ringing signals on a subscriber loop 302[x] from a ring generator (not shown) of the central office 306 after a ring trip is detected by power cross and ring trip detection module 722. The ring generator (not shown) is preferably not disconnected after a ring trip detection until a voltage zero crossing is detected to avoid damaging the ring relays. Ring trip detection is further illustratively described in U.S. patent application, Ser. No. 08/870,893, by Yan Zhou, entitled "Ring Trip Detection In A Communication System", filed concurrently with this patent application and incorporated by reference in its entirety. The switch hook detection module detects loop start signaling on-and off-hook transitions and detects make and break signals (dial pulses). Switch hook detection is further illustratively described in U.S. patent application, Ser. No. 08/870,892, by Yan Zhou, entitled "Switch Hook Status Determnination In A Communication System", filed concurrently with this patent application and incorporated by reference in its entirety. The ground key detection module executed by the digital signal processor core 608 in subscriber loop status and decimation operation 712 detects ground start signaling. After executing the zero cross detection, switch hook detection, and ground key detection modules, the 4 kHz sampled data Vab, Ia, and Ib for each subscriber loop, and Vbat data is decimated to a 250 Hz sampling frequency.

Proceeding to system status operation 714, digital signal processor core 608 interprets the zero crossing detection, switch hook detection, and ground key detection status information obtained in subscriber loop status and decimation operation 712 and takes appropriate action such as identifying and forwarding to the central office 306 a number dialed by terminal equipment based upon the number of make and break connections determined by the switch hook detection module, supplying a dial tone to terminal equipment that has seized a subscriber loop, and disconnecting a ringing signal at a zero crossing after a ring trip.

Figure 8:
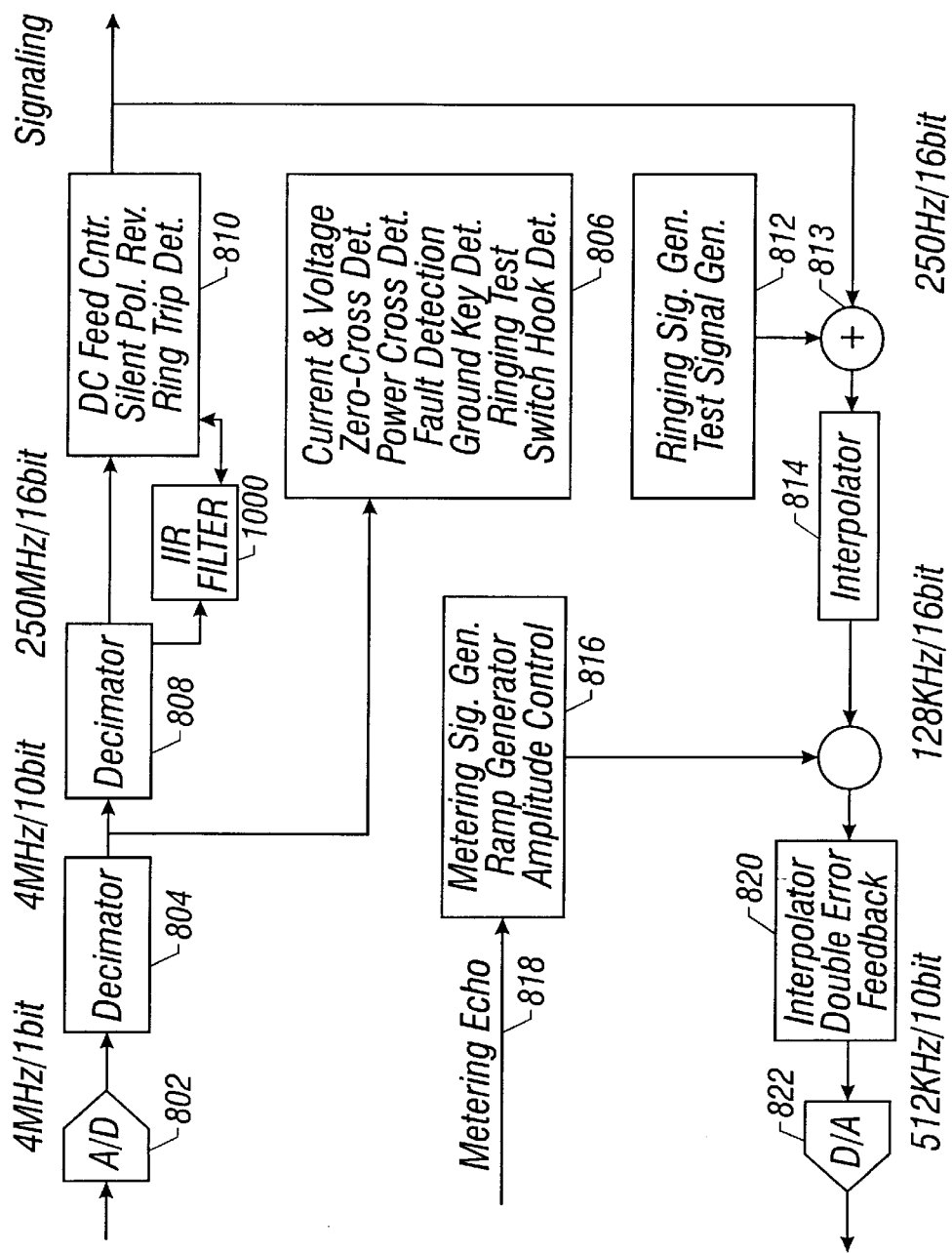
FIG. 8 illustrates input and output data sampling frequencies utilized by the line card of FIG. 5 for each supported subscriber loop.

In one embodiment of the signal processing flow 700, the digital signal processing DC feed control, silent polarity reversal, and ring trip detection functions in the DC feed control module 718 and power cross and ring trip detection module 722 may be performed at a rate relatively lower to other functions while achieving satisfactory performance. Referring to FIG. 8, input and output data sampling frequencies utilized by digital signal processor core 608 for each of supported subscriber loops 302[16:1] are illustrated. As described above, each of the quad converters 506[4:1] performs an A/D conversion 802 on signals received from connected XASLICs 504[16:1] and provides a 4 MHz serial data stream to digital signal processor 508. Decimator 804 of converter chip interface 602 decimates the 4 MHz serial data stream to a sampling frequency of 4 kHz and provides a 10 bit parallel output signal to digital signal processor core 608 which contains the sampled parametric data for each of the supported subscriber loops 302[16:1] stored in RAM 614. Current and voltage zero cross detection, switch hook detection, and ground key detection modules of operation 712 (FIG. 7), the power cross detection module of operation 722 (FIG. 7), and fault detection module of operation 720 (FIG. 7), corporately shown in operation 806, operate at a 4 kHz rate and utilize the 4 kHz sampled parametric data. The 4 kHz data stream is further decimated to a sampling frequency of 250 Hz by decimator 808 of the converter chip interface 602. The DC feed control and silent polarity reversal modules of operation 718 (FIG. 7) and ring trip detection module of operation 722 (FIG. 7), corporately shown in operation 810, operate at 250 Hz and utilize the 4 KHz and 250 Hz sampled data.

Quad converters 506[x] interpolate DC feed control signals, silent polarity reversal signals, and any ringing and test signals from central office 306 ring and test signal generators 812 from adder 813 to a 128 kHz sampling frequency, 16 bit data stream with interpolator 814. Output signals from metering signal, ramp generator, and amplitude control operation 816 are added by adder 815 to the output data signals of 814. Operation;: block 816 is illustratively described by Zhou, et al., "Metering Signal Level Control Circuit," U.S. Pat. No. 5,452,345. These composite output signals are for a single subscriber loop 302[x] with each of subscriber loops 302[16:1] being processed serially. For each subscriber loop 302[x], the digital composite output signal from adder 815 is interpolated to a 512 kHz sampling frequency, 10 bit output signal by the single error feedback interpolator 820 in a quad converter 506[x] and converted into an analog signal with the D/A converter 822 of quad converter 506[x] for input to the XASLIC 504[x] connected to the subscriber loop 302[x] just processed.

The digital signal processing DC feed control, silent polarity reversal, and ring trip detection functions in the DC feed control module 718 and power cross and ring trip detection module 722 are low rate functions performed at 250 Hz, one-sixteenth the rate of the subscriber loop status and decimation operation 712 functions. Accordingly, during a single pass through signal processing flow 700, these 250 Hz low rate functions are only executed for a single subscriber loop 302[x] and are executed for each of subscriber loops 302[16:1] only once every 16 passes. The channel identification module 716 identifies which of subscriber loops 302[16:1] is to be processed during the next execution of operations 718, 720, and 722. After identification, the feed control module 718 provides DC feed control, silent polarity reversal, and a ringing test for the identified subscriber loop 302[x].

Figure 9:
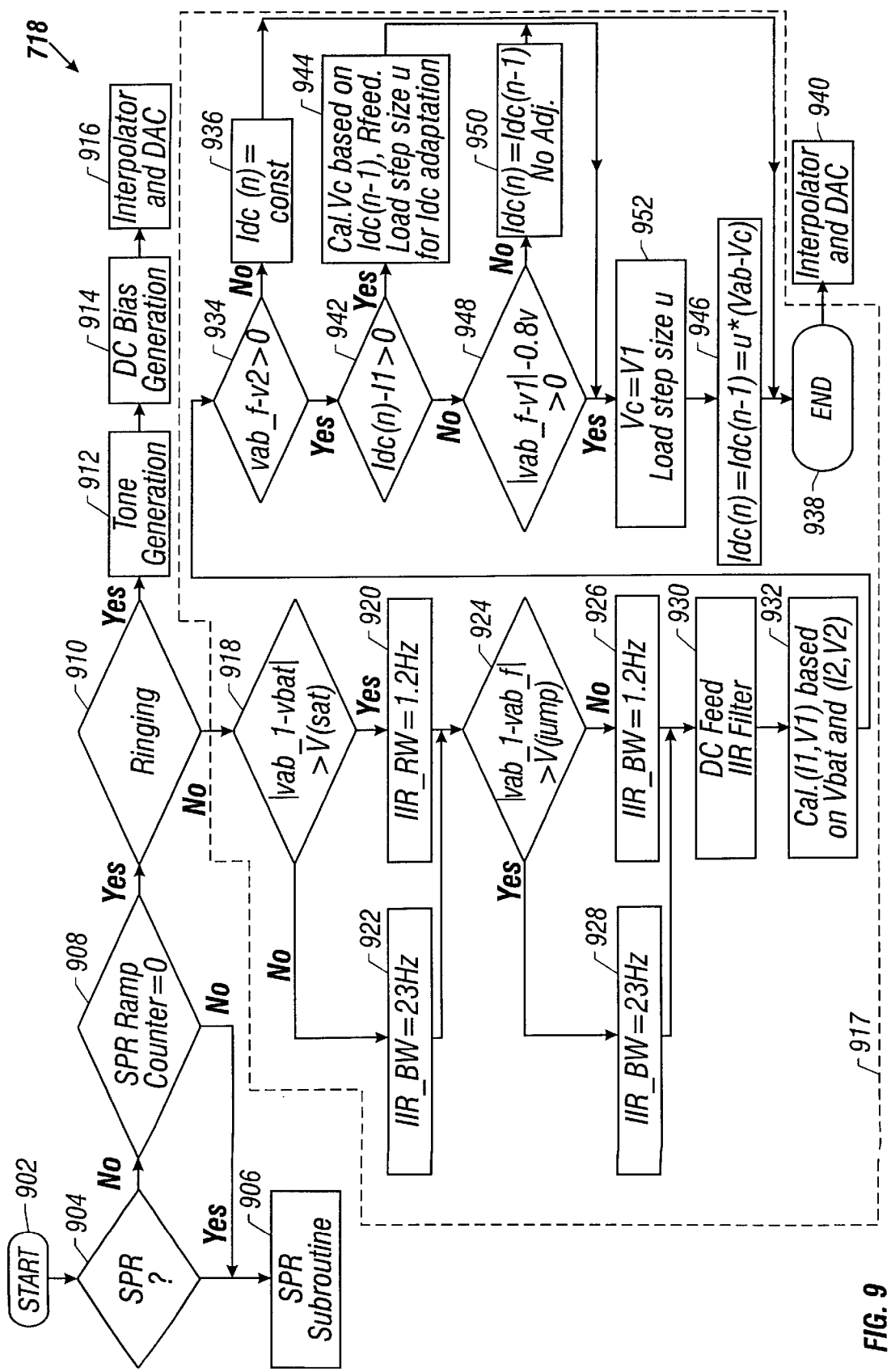
FIG. 9 illustrates an embodiment of the feed control module of the digital signal processor execution timing flow diagram of FIG. 7.

Referring to FIG. 9, the DC feed control module of the feed control module 718 is shown in more detail. The digital signal processor core 608 starts the feed control module 718 in start operation 902 by accessing the feed control module 718 in memory. The feed control module 718 in operation 904 initially determines whether the central office 306 has requested a polarity reversal. If a polarity reversal request is received or if a silent polarity reversal ramp counter does not equal zero in operation 908, the feed control module 718 executes a silent polarity reversal module as illustratively described in U.S. patent application, Ser. No. 08/870,894, filed concurrently with this patent application, entitled "Silent Polarity Reversal In A Communication System" by Yan Zhou, and incorporated herein by reference in its entirety.

The digital signal processor core 608 next executes operation 910 which determines whether or not a ringing signal is being applied to the subscriber loop 302[x]. If so, tone or trapezoidal waveforms in tone generation operation 912 are combined with a DC bias from DC bias generation module 914 and provided to adder 813.

Figure 10:
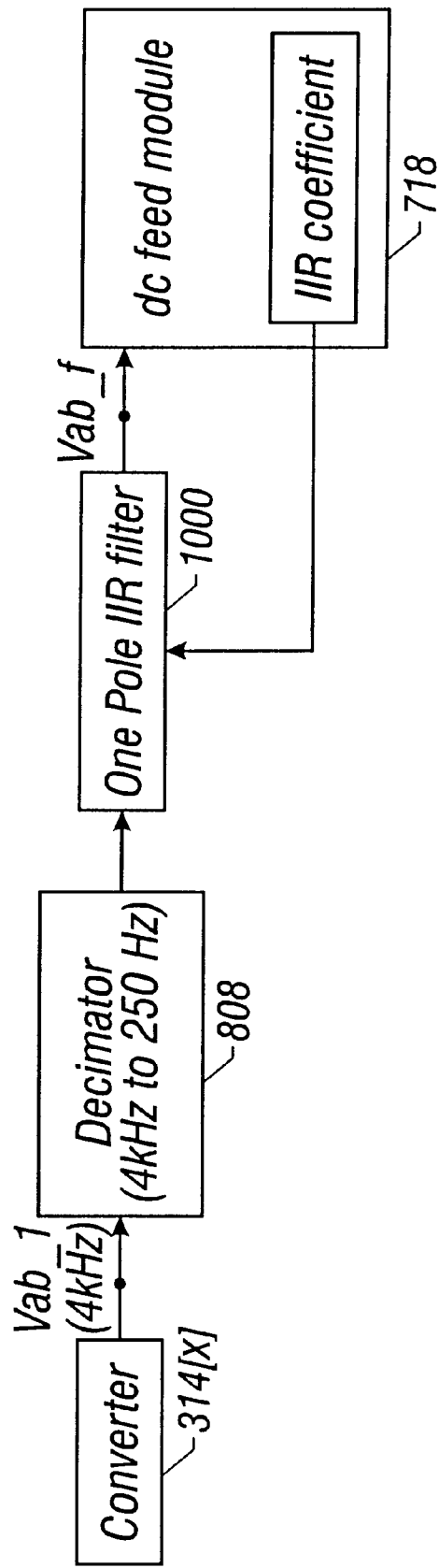

If in operation 910 no ringing signal is present, a DC feed module 917 is entered at operation 918 and ensures that power delivered to the subscriber loops 302[16:1] remains within a regionally specified power feed envelope, such as the illustrative power envelope of FIG. 4, and, for example, avoids saturation of circuit 10 devices in each of the XAS-LICs 504[16:1] and terminal equipment 312[16:1]. The DC feed module 917 also reduces noise transmission in high current gain regions of a power feed envelope. To control the power delivered to each of subscriber loops 302[16:1], the digital signal processor core 608 utilizes a low pass, digitally filtered sampled voltage data (Vab_f) from across the A and B conductors of the subscriber loop. Vab_1 is the Vab line voltage data of subscriber loop 302[x] sampling and decimation output signal from decimator 804. Vab_f is digitally filtered voltage data determined by passing Vab_1 through decimator 808 and through one pole IIR filter 1000 of FIG. 10. The IIR filter 809 is characterized by the recursive equation $y(n)=(1-a)*y(n-1)+ax(n)$ and the z transfer function $H(z)=a/[1-(1-a)/z]$. The coefficient "a" of the IIR filter 809 is normally programmed to be $1/32$, which provides a 1.2 Hz low pass filter cut off frequency. The programmability of 'a' provides flexibility to adapt to changing subscriber loop conditions and allows transient response time adaptation in accordance with determinations made in feed control module 718 as described below.

Subscriber loop parametric status generally changes over time for many reasons including on- and off-hook transitions, make and break signals, varying parasitic impedance, and noise signals. Thus, DC power feed to the subscriber loops 302[16:1] is regularly monitored and adjusted by digital signal processor core 608 in response to changing subscriber loop status. Transmission circuit devices, such as operational amplifiers, in the XASLICs 504[16:1] operate between 0 V and Vbat, the battery voltage supplied by the central office 306. Thus, all AC swings, representing transmitted data signals superimposed on a DC feed bias signal, should remain between 0 V and Vbat to avoid clipping. Maximum AC power swings are generally 3 dBm and equate to approximately 2–5 V peak to peak for typical subscriber loop impedance. Accordingly, a margin referred to herein as Vsat should remain between Vab_DC and Vbat to a void saturating circuitry of XASLICs 504 [16:1] and terminal equipment 312[16:1] and, thus, avoid signal clipping. Vsat is programmable and is selected to provide a sufficient voltage swing to prevent signal clipping. Normally, Vsat is in th e range of 2–4 V to accommodate 4–8 V AC signal peak to peak level swings. The quality of data signal transmissions to the terminal equipment may be mildly to severely degraded depending upon the degree of any signal clipping.

In operation 918, the margin between Vbat, which is nominally −48 V, and Vab_1 is determined and compared to Vsat. Vab_1 is sampled at, for example, 4 kHz to closely reflect real time subscriber loop 302[x] voltage Vab. Vbat is subtracted from Vab_1. The absolute value of Vab_1 minus Vbat (abs (Vab_1 minus Vbat)) is determined to accommodate any instances when Vab_1 exceeds Vbat. If abs(Vab_1 minus Vbat) is greater than Vsat, the margin between Vab_1 and Vbat is sufficient to avoid clipping XASLIC 504[ 16:1] output signals. The DC feed module 917 next proceeds to operation 920 which sets the IIR filter 1000 coefficient 'a' of digital signal processor core 608 to $1/32$ which provides the 1.2 Hz low pass cut off frequency.

If abs(Vab_1 minus Vbat) is less than or equal to Vsat, the narrow margin between Vab_1 and Vbat indicates that subscriber loop 302[x] impedance conditions are changing and saturation of XASLIC 304[x] or terminal equipment 312[x] circuitry may occur. When the low pass filter bandwidth of IIR filter 1000 is 1.2 Hz, the transient response time of IIR filter 1000 to changing Vab_1 may be too slow to allow DC feed module 917 to react quickly enough to prevent saturation. Thus, if abs(Vab_1 minus Vbat) is less than or equal to Vsat, the digital signal processor core 608 adapts by opening the bandwidth of IIR filter 1000 to 25 Hz by changing the programmable coefficient 'a' to $1/2$. The transient response time of IIR filter 1000 is thus decreased to $1/(2\pi f)$ or approximately 6.4 milliseconds (ms). By decreasing the transient response time, DC feed module 917 utilizes data that more closely corresponds to actual subscriber loop conditions to maintain the power feed to the subscriber loop within a predetermined power feed envelope. The output signal of IIR filter 1000, Vab_f, will recover to Vab_1 in approximately 6.4 ms.

Even when operation 918 does not detect saturation conditions, Vab_f should follow Vab_1 closely to validate power feed calculations with respect to actual subscriber loop 302[x] status conditions. When the low pass bandwidth of IIR filter 1000 is set to 1.2 Hz, the transient response time of IIR filter 1000 of $1/(2\pi f)$ or approximately 13 ms may not be able to follow sudden subscriber loop 302[x] voltage changes quickly enough to allow DC feed module 917 to keep subscriber loop 302[x] DC power feed within the predetermined power feed envelope. Thus, the magnitude of a voltage jump is compared to a threshold value to determine whether actual subscriber loop 302[x] conditions are approaching a boundary of the predetermined power feed envelope. In operation 924, abs(Vab_1 minus Vab_f) is compared to Vjump. Vjump is chosen to allow DC feed module 917 enough time to respond to a sudden voltage change and maintain subscriber loop 302[x] DC feed characteristics within the predetermined power feed envelope. Additionally, Vjump is chosen to be slightly greater than the maximum AC peak to peak swing voltage so that AC swings do not trigger the digital signal processor core 608 in operation 924 to open the IIR filter 1000 bandwidth. Generally, Vjump is chosen to be slightly greater than the maximum AC peak-to-peak swing voltage to allow Vab_f to quickly catch up to Vab-1.

If abs(Vab_1 minus Vab_f) is less than or equal to Vjump, Vab_f is sufficiently following Vab_I to allow DC feed module 917 to maintain subscriber loop DC power feed within the predetermined power feed envelope. Accordingly, the IIR filter 1000 coefficient 'a' is set to 1/32 to provide the 1.2 Hz low pass bandwidth. If abs(Vab__1 minus Vab__f) is greater than Vjump, a sudden subscriber loop voltage change has occurred, and the IIR filter 1000 coefficient 'a' is set to ½ in operation 928 to open the bandwidth to 25 Hz and decrease the transient response time of IIR filter 1000 as described above. Vab__f will recover to Vab__1 in approximately 6.4 ms, thus, validating the power feed calculations which determine the DC current feed to subscriber loop 302[x]. Thus, the transient response time of DC feed module 917 is increased without increasing the operating rate of DC feed module 917. Although IIR filter 1000 low pass bandwidth may be opened to greater than 25 Hz, in both operations 922 and 928, the 25 Hz bandwidth increases transient response time while continuing to filter out typical audio frequencies to prevent unwanted audio sound at the terminal equipment.

Referring to FIGS. 4 and 9, the DC feed module 917 next proceeds to operation 930, and the output of IIR filter 1000, Vab__f, is stored for use in subsequent operations. In operation 932, the coordinates (I1, V1) are calculated to determine the shape of DC battery feed curve 408 in FIG. 4. The calculation is based upon sampled Vbat, which sets the maximum Vab__met for subscriber loop 302[x], and programmable coordinates (I2,V2) which designate maximum DC feed operating conditions within the predetermined power feed envelope. Next, in operation 934, if Vab__f is less than V2, the subscriber loop 302[x] metallic DC feed current control signal, Idc(n), is set to a constant, I2, which is predetermined to maintain the power feed to subscriber loop 302[x] within predetermined power feed standards as illustratively shown in FIG. 4. ldc(n) controls the DC current feed output by the XASLIC 504[x] connected to the subscriber loop 302[x] currently being processed by DC feed module 917 with "(n)" representing the current execution cycle. The DC feed module 917 subsequently ends at operation 938. In operation 940, Idc(n) is interpolated by the interpolators 814 and 820 of converter 514[x], coupled to XASLIC 504[x], to a sampling frequency of 512 kHz and 10 bit resolution. The converter 514[x] converts the digital, interpolated Idc(n) control signal to an analog input signal to directly control amplifiers of XASLIC 504[x] (not shown).

Proceeding to operation 942 from operation 934, if Vab__f is greater than V2 and Idc(n) is greater than I1 in FIG. 4, an Idc(n) is calculated in operations 944 and 946 to determine a power feed operating point along DC battery feed curve 408 as illustratively described in "Zhou—Digital Direct Current Feed Control." After ending at operation 938, the feed control module 718 proceeds to operation 940 as described above.

If Vab__f is greater than V2 and Idc(n) is less than or equal to I1, the present operating point of the subscriber loop 302[x] on load line 406 lies in the saturation region 410 near the constant voltage (VI) portion of the DC battery feed curve 408. The saturation region 410 is characterized by high subscriber loop resistance, and, thus, high Idc (Ia–Ib) current gain. Relatively minor fluctuations in Vab__f and Idc indicate minor subscriber loop 302[x] operating point changes due to, for example, noise voltages. Operation 948 detects minor subscriber loop 302[x] operating point changes and prevents amplification of minor voltage changes. As indicated in operation 950, if Vab__f fluctuates within a predetermined subscriber loop 302[x] power operating window 412, no adjustment is made to Idc(n), and Idc(n) is set to equal Idc(n−1) (Idc(n) from the previous pass through DC feed module 917 for a single subscriber loop 302[x]. DC feed module 917 next ends at operation 938 as described above. Window 412 is chosen to avoid minor voltage changes while preventing the actual Vab of subscriber loop 302[x] from increasing to a value that saturates any circuitry due to DC biased AC signals. Window 412 illustratively equals V1 plus or minus 0.8 volts. If Vab__f is outside of the window 412, Idc(n) is determined in operations 952 and 946 using feedback which will move the subscriber loop 302[x] operating point onto DC battery feed curve 408, as described in "Zhou—Digital Direct Current Feed Control." The DC feed module 917 then ends at operation 938, and feed control module 718 proceeds as described above.

Referring to FIG. 7, after exiting the feed control module 718, fault detection module 720 determines whether a fault exists.

Signal processing flow 700 then proceeds to power cross and ring trip detection module 722 to detect power zero crossing and a ring trip. The ring trip detection is further illustratively described in Yan Zhou, "Ring Trip Detection In A Communication System." After executing power cross and ring trip detection module 722, RAM contents are reset in operation 724 in anticipation of subsequent decimation functions.

Operation 726 detects an interruption from a system timer (not shown) which occurs at the operating frequency of signal processing flow 700, which in one embodiment is 4 kHz. If the interruption is not received, signal processing flow 700 enters a wait state in operation 728 until the interruption is received. During the wait state, digital signal processing core 608 may perform other functions such as processing audio signals.

While the invention has been described with respect to the embodiments and variations set forth above, these embodiments and variations are illustrative and the invention is not to be considered limited in scope to these embodiments and variations. For example, various sampling and operating rates are indicated which may be changed in accordance with factors such as the processing speed of the digital signal processor core 608 and memory capacity of digital signal processor 508. Additionally, it will be apparent to those of ordinary skill in the art that many of the functions of communication system 300 may be implemented in hardware or software. Also, circuitry may be used to establish a wireless link between each line card 308[m:1] and a central office to provide, for example, remote data and control access. Furthermore, redundant line cards and/or redundant subscriber loop interface circuits may be implemented and switched in when necessary to replace corresponding defective circuitry. Accordingly, various other embodiments and modifications and improvements not described herein may be within the spirit and scope of the present invention, as defined by the following claims.

What is claimed is:

1. A method comprising:
    sampling data across conductors of a transmission line in a communication system;
    digitally filtering the sampled data at a first bandwidth of a digital filter;
    detecting a sampled data condition;
    determining if the sampled data is within a predetermined window;
    changing the bandwidth of the digital filter to a larger, second bandwidth if the sampled data is within the predetermined window; and
    supplying time varying signals biased by a direct current to the transmission line with electronic circuitry, having a supply voltage rail, coupled to the transmission line;

wherein the predetermined window allows the electronic circuitry to maintain the direct current at a level that supplies the time varying signals to the transmission line without saturating.

2. The method as in claim 1 wherein the bandwidth of the digital filter is changed to the larger, second bandwidth if the sampled data is outside of the predetermined window to allow the filtered data to more rapidly follow changes in the sampled data.

3. The method as in claim 1 wherein the transmission line is a subscriber loop of a communication system, and sampling data comprises:

sampling voltage data across tip and ring conductors of a subscriber loop.

4. The method as in claim 1 wherein the second bandwidth of the digital filter substantially passes subaudio frequencies.

5. The method as in claim 1 wherein the first bandwidth of the digital filter is about 1.2 Hz and the second bandwidth of the digital filter is about 25 Hz.

6. The method as in claim 1 wherein the digital filter is an infinite impulse response filter.

7. A method comprising:

sampling data across conductors of a transmission line in a communication system;

digitally filtering the sampled data at a first bandwidth of a digital filter;

detecting a sampled data condition;

determining if the filtered data corresponds to the sampled data within a predetermined margin;

changing the bandwidth of the digital filter to a larger, second bandwidth if the sampled data is outside of the predetermined margin to allow the filtered data to more rapidly follow changes in the sampled data;

supplying a time varying signal biased by a direct current, to the transmission line with electronic circuitry coupled to the transmission line;

wherein the predetermined margin is slightly greater than an absolute value of a peak swing of the time varying signal.

8. The method as in claim 7 wherein the transmission line is a subscriber loop of a communication system, and sampling data comprises:

sampling voltage data across tip and ring conductors of a subscriber loop.

9. The method as in claim 7 wherein the second bandwidth of the digital filter substantially passes subaudio frequencies.

10. The method as in claim 7 wherein the first bandwidth of the digital filter is about 1.2 Hz and the second bandwidth of the digital filter is about 25 Hz.

11. The method as in claim 7 wherein the digital filter is an infinite impulse response filter.

12. A method comprising:

sampling data across conductors of a transmission line in a communication system;

digitally filtering the sampled data at a first bandwidth of a digital filter;

detecting a sampled data condition;

changing the bandwidth of the digital filter to a larger, second bandwidth in response to detecting the sampled data condition to increase the response time of the digital filter;

supplying power from the communication system to the transmission line;

determining a power curve for the supplied power to follow, the power curve having a saturation region;

regulating the supplied power in accordance with the power curve unless the supplied power is within the saturation region; and if the supplied power is in the saturation region of the power curve, regulating the supplied power within a predetermined window in the power curve saturation region without changing the supplied power if the supplied power is within the predetermined window.

13. A method comprising:

sampling data across conductors of a transmission line in a communication system;

digitally filtering the sampled data at a first bandwidth of a digital filter;

detecting a sampled data condition;

changing the bandwidth of the digital filter to a larger, second bandwidth in response to detecting the sampled data condition to increase the response time of the digital filter;

wherein digitally filtering the sampled data at a first bandwidth of a digital filter, detecting a sampled data condition, and changing the bandwidth of the digital filter to a larger, second bandwidth in response to detecting the sampled data condition to increase the response time of the digital filter are implemented as code in a direct current feed module stored in a memory coupled to a processor, the method further comprising:

executing the direct current feed module with the processor.

14. A method of feeding direct current to a transmission line in a communication system and adapting to an impedance change in the transmission line comprising:

feeding direct current to the transmission line with circuitry of the communication system;

sampling a voltage (Vab) across an A conductor and a B conductor of the transmission line to obtain Vab__1;

digitally filtering Vab__1 at a first bandwidth to obtain a filtered voltage (Vab__f);

determining if Vab__f has diverged from Vab__1 outside of a first predetermined margin;

changing the first bandwidth to a larger, second bandwidth so that Vab__f more rapidly follows Vab within a predetermined amount of time.

15. The method as in claim 14 wherein the first predetermined margin is large enough to prevent AC signal voltage swings from changing the first bandwidth to a larger, second bandwidth and small enough to allow Vab__f to rapidly converge toward Vab__1.

16. The method as in claim 14 further comprising:

determining if Vab__1 has converged upon a supply voltage rail of the circuitry within a second predetermined margin; and changing the first bandwidth to a larger, third bandwidth so that Vab__f more rapidly follows Vab.

17. The method as in claim 16 wherein the predetermined margin is a voltage level approximately equal to a peak voltage of a time varying signal.

18. The method as in claim 14 further comprising:

supplying power from the communication system to the transmission line;

determining a power curve for the supplied power to follow, the power curve having a saturation region;

regulating the supplied power in accordance with the power curve unless the supplied power is within the saturation region; and if the supplied power is in the saturation region of the power curve, regulating the supplied power within a predetermined window in the power curve saturation region without changing the supplied power if the supplied power is within the predetermined window.

19. A communication system comprising:

circuitry for sampling signal data on a subscriber loop;

a line card having interface circuitry to supply current to the subscriber loop and having a processor and a memory, the memory storing code for execution by the processor, the code including instructions for processing the signal data with a low pass filter to substantially remove an alternating current signal component from the signal data, for detecting a ring trip on the subscriber loop, for detecting a short duration short circuit at the subscriber loop, and for increasing the bandwidth of the low pass filter if a short duration short circuit at the subscriber loop is detected to increase the transient response time of the low pass filter to prevent saturation of the interface circuitry.

20. The communication system as in 19 further comprising:

terminal equipment having a switch hook in the subscriber loop.

21. The communication system as in 19 wherein the code further includes instructions to accommodate integral ringing signals and external ringing signals.

22. The communication system as in claim 19 wherein the low pass filter is a digital filter.

23. A communication system comprising:

means for conducting a signal;

means for sampling data from the means for conducting;

means for digitally filtering the sampled data at a first bandwidth;

means for detecting a sampled data condition; means for determining if the sampled data is within a predetermined window;

means for changing the bandwidth of the digitally filtering means to a larger, second bandwidth in response to detecting the sampled data condition to increase the response time of the digital filtering means; and means for supplying time varying signals biased by a direct current to the transmission line with electronic circuitry, having a supply voltage rail, coupled to the transmission line;

wherein the predetermined window allows the electronic circuitry to maintain the direct current at a level that supplies the time varying signals to the transmission line without saturating.

24. A communication system comprising:

a line card having subscriber loop terminals to connect to respective subscriber loops, the line card further having:

a plurality of subscriber line interface circuits coupled to respective subscriber loop terminals;

a plurality of analog to digital converters coupled to respective groups of the subscriber line interface circuits;

a processor coupled to the analog to digital converters;

a memory coupled to the processor and storing code for execution by the processor for data from each subscriber line interface circuit, the code having instructions to compare a sampled voltage across the subscriber loop terminals, Vab__l, with a supply voltage used by the respective subscriber line interface circuit, to process Vab__l with a first digital low pass filter to obtain Vab__f, to open the bandwidth of the first digital low pass filter if the comparison between Vab__l and the supply voltage is within a first predetermined margin, to compare Vab__l with Vab__f, and to open the bandwidth of a second digital low pass filter if the comparison between Vab__l and Vab__f is outside of a second predetermined margin.

25. The communication system of claim 24 further comprising:

a plurality of subscriber loops coupled to respective subscriber loop terminal pairs, the subscriber loops having terminal equipment coupled across the subscriber loop terminal pairs.

26. The communication system of claim 24 wherein the code further includes instructions to determine a power feed curve having a saturation region, to determine if Vab__f is on the power feed curve, to determine an adjustment factor for the respective subscriber loop interface circuit to place Vab__f on the power feed curve if Vab__f is not on the power feed curve unless Vab__f is within a third predetermined margin in the saturation region, and to maintain a constant power feed to the subscriber loop terminals if Vab__f is within the third predetermined margin.

27. The communication system as in claim 26 wherein the first predetermined margin allows the processor to control direct current levels supplied by respective subscriber line interface circuits generally without saturating time varying signals supplied by respective subscriber line interface circuits, the second predetermined margin is large enough to ignore differences between Vab__l and Vab__f substantially attributable to peak to peak voltage changes of the time varying signals and small enough to allow Vab__f to rapidly converge toward Vab__l, and wherein the third predetermined window allows Vab__f to reside in the saturation region without causing the time varying signals to saturate.

28. A communication system comprising:

circuitry for sampling voltage on a subscriber loop;

a line card having a processor and a memory, the memory storing code for execution by the processor, the code including instructions to determine a power feed curve having a saturation region, to determine if the subscriber voltage is on the power feed curve, to determine an adjustment factor for the respective subscriber loop interface circuit to place the subscriber loop voltage on the power feed curve if the subscriber loop voltage is not on the power feed curve unless the subscriber loop voltage is within a third predetermined margin in the saturation region, and to maintain a constant power feed to the subscriber loop terminals if the subscriber loop voltage is within the third predetermined margin.

* * * * *